United States Patent
Chen et al.

(10) Patent No.: US 10,334,035 B2
(45) Date of Patent: Jun. 25, 2019

(54) LOAD BALANCING BASED ON USER BEHAVIOR PREDICTION

(71) Applicant: International Business Machines Corporation, Armonk, NY (US)

(72) Inventors: Dong Chen, Beijing (CN); Xiao Hua Shen, Shanghai (CN); Ling Chen, Beijing (CN); Li Ni Zhang, Beijing (CN); Min Min Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 15/067,221

(22) Filed: Mar. 11, 2016

(65) Prior Publication Data
US 2017/0264679 A1 Sep. 14, 2017

(51) Int. Cl.
- *G06F 15/173* (2006.01)
- *H04L 29/08* (2006.01)
- *H04L 12/803* (2013.01)

(52) U.S. Cl.
CPC ........ *H04L 67/1023* (2013.01); *H04L 47/125* (2013.01); *H04L 67/306* (2013.01)

(58) Field of Classification Search
CPC .. H04L 67/1023; H04L 47/125; H04L 67/306
USPC ....................................................... 709/223
See application file for complete search history.

(56) References Cited

U.S. PATENT DOCUMENTS

| | | | |
|---|---|---|---|
| 5,283,897 A | 2/1994 | Georgiadis et al. | |
| 7,672,863 B2 | 3/2010 | Kurosawa et al. | |
| 8,291,108 B2 | 10/2012 | Raja et al. | |
| 8,606,921 B2 | 12/2013 | Vasquez et al. | |
| 8,725,886 B1 | 5/2014 | Pulier et al. | |
| 9,015,414 B2 | 4/2015 | Sabir | |
| 2011/0282997 A1* | 11/2011 | Prince ................. | H04L 61/1511 709/226 |
| 2013/0238540 A1* | 9/2013 | O'Donoghue ........... | G06N 5/02 706/46 |
| 2015/0039766 A1 | 2/2015 | Bachar et al. | |

OTHER PUBLICATIONS

Leon et al., "Load Balancing in Distributed Systems using Cognitive Behavioral Models", Department of Automatic Control and Computer Engineering, Technical Univeristy "Gh. Asachi", Iasi, printed on Dec. 18, 2015, 9 pages.

* cited by examiner

*Primary Examiner* — Alan S Chou
(74) *Attorney, Agent, or Firm* — Steven R. Yoder (57) ABSTRACT

A method for load balancing is provided based on a user behavior pattern. The user behavior pattern is generated from historical user data to predict next operations a user would perform. Further, the user behavior pattern is bound to resource consumption, and a user and resource type is linked by a weighted value. Load balancing strategies are employed according to the weighted value of the user other than using connection count.

14 Claims, 4 Drawing Sheets

LOAD BALANCING BASED ON USER BEHAVIOR PREDICTION

BACKGROUND

The present invention relates generally to the field of computer software, and more particularly to load management.

Internet-based online businesses are widely accepted. In general, an organization sets up its websites on the Internet with information content, e-mail, and e-commerce facilities, such that the organization can offers its services on the Internet. Such online services include selling goods, voice, video, Internet chat, conference call, high-bandwidth file transfer, databases, and so forth, which are generally provided from multiple servers. The underlying computing systems supporting such online business, such as multiple servers, commonly involve computing load balancing or management.

Load balancing refers to distributing workloads across multiple computing resources, for example, computers, a computer cluster, network nodes, central processing units and/or disk drives. The goals of load balancing include optimizing resource use, maximizing throughput, minimizing response time, and/or avoiding overload of any single resource. Load balancing usually involves dedicated software or hardware with multiple components.

SUMMARY

In one aspect of the present invention, a method is provided comprising: detecting a login of a user on a load balancing system, the load balancing system including a set of servers; receiving a user profile associated with the user; defining a load balancing strategy based, at least in part, on the user profile; determining a strategic server from the set of servers based, at least in part, on the load balancing strategy; and directing the user to the strategic server.

DETAILED DESCRIPTION

A method is provided for accurately balancing computing workload based on user behavior pattern. The user behaviors are predicted based on historical user data collected and are bound with the resource consumption. A target server is selected based on the prediction result which make load balancing more accurate. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

Figure 1:
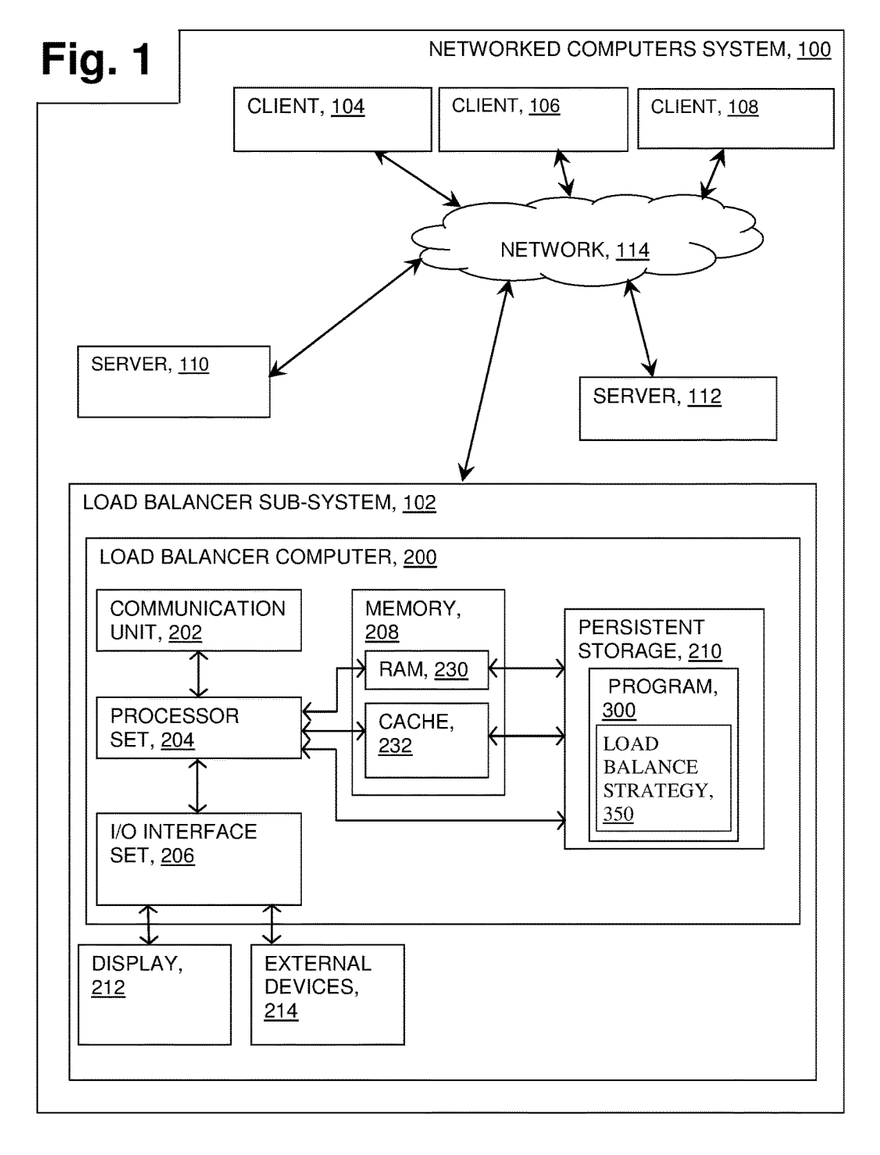
FIG. 1 is a schematic view of a first embodiment of a system according to the present invention.

The present invention will now be described in detail with reference to the Figures. FIG. 1 is a functional block diagram illustrating various portions of networked computers system 100, in accordance with one embodiment of the present invention, including: load balancer sub-system 102; client sub-systems 104, 106, 108; servers 110, 112; communication network 114; load balancer computer 200; communication unit 202; processor set 204; input/output (I/O) interface set 206; memory device 208; persistent storage 210; display device 212; external device 214; random access memory (RAM) devices 230; cache memory device 232; program 300; and load balance strategy 350

Client sub-system 104, 106, 108, and servers 110, 112, may be a laptop computer, tablet computer, netbook computer, personal computer (PC), a desktop computer, a personal digital assistant (PDA), a smart phone, or any programmable electronic device capable of communicating with the load balancer sub-systems 102 via network 114.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Alternatively, a portion of program 300 may be stored in client sub-system 104, 106, 108, and servers 110, 112. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with computer 200. For example, I/O interface set 206 provides a connection to external device 214. External device 214 will typically include devices such as a keyboard, keypad, a touch screen, and/or some other suitable input device. External device 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Figure 3:
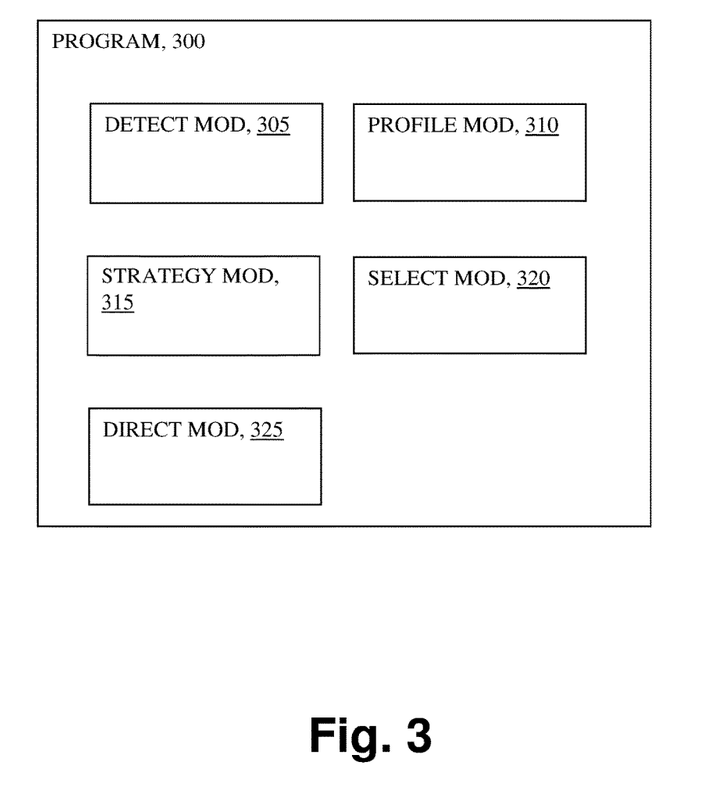
FIG. 3 is a schematic view of a machine logic (for example, software) portion of the system depicted in FIG. 1.

Program 300 including load balance strategy 310 operates to balance load based on a user behavior prediction which is generated from historical user data. A set of predicted user operations, user characters and groupings are also derived from the historical user data. User operations are mapped with resource consumption through (but not limited to) protocol, user performance baseline, and so forth. Further, a user profile is created and a user profile value is used to select load server through load balancer.

Some embodiments of the present invention recognize the following facts, potential problems and/or potential areas for improvement with respect to the current state of the art: (i) conventional load balancing only distinguishes the difference between user sessions and/or resource usage, transactions, and so on; (ii) conventional load balancing is only based on real-time information, which may cause the load to become unbalanced after a load is assigned; and/or (iii) conventional load balancing does not consider the consumption of combined resource type and thus, does not maximize usage of available resource.

Load balancing is widely used in business systems, applications and websites to deal with increasing user transactions within a system. There are many strategies for load balancing based on user sessions, transactions, and/or connections. As mentioned above, such conventional load balancing strategies present limitations. As such, some embodiments of the present invention provide a method for improving load balancing.

Specifically the user historical data is gathered when a user visits a system. User operation habit is analyzed through the collected user data and a pattern of user behavior is identified. The user's operation is bound to one kind of resource consumption and coefficient and weight based on average user data is calculated as well. The user's operation on next login of the system can then be predicted. With the predicted action of the user, the resource the user would consume is able to be known before the user takes an action. Considering the resource condition of each server (e.g., servers 110, 112 in FIG. 1) behind a load balancer, a suitable server is able to be selected and a load balance strategy would assign the user to the selected server. The load balance strategy employs a weighted value or weight that is calculated based on the user behavior.

Further, to facilitate the load balancing, a user profile with general info and weighted resource consumption matrix is constructed including: (i) user character tag; (ii) grouping information; and (iii) resource consumption matrix. The user character tag includes, but is not limited to: (i) operating frequency; (ii) residence time; (iii) operating type; (iv) user preference. The grouping information is on different dimensions based on target system characteristic. The resource consumption matrix includes, but is not limited to: (i) CPU consumption; (ii) memory consumption; (iii) I/O read consumption; and (iv) I/O write consumption.

Figure 2:
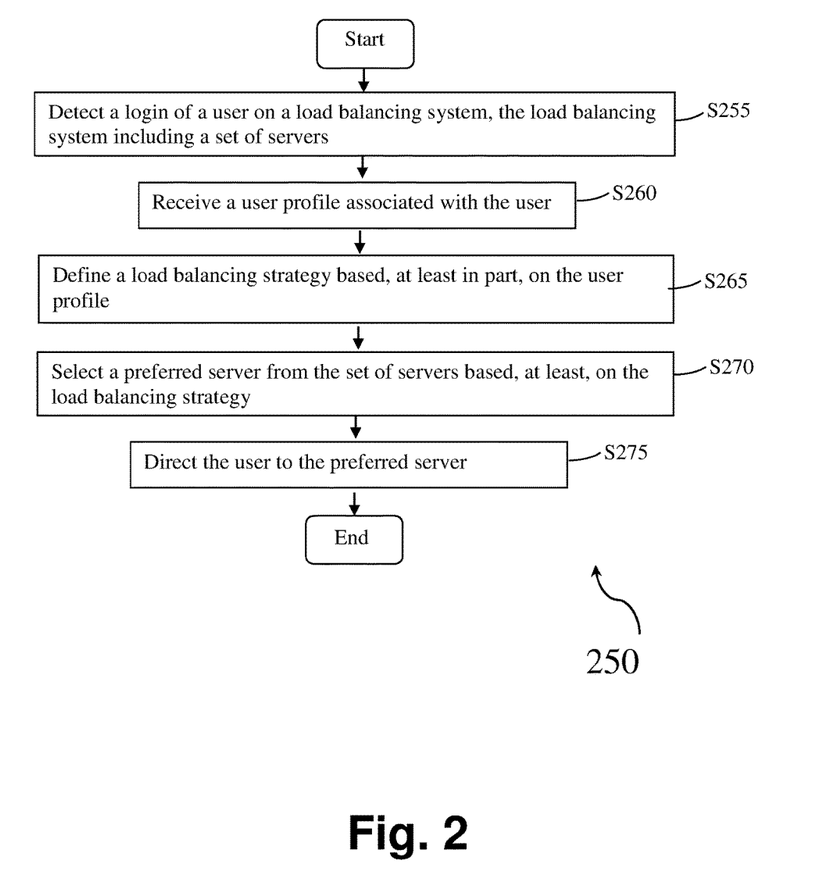
FIG. 2 is a flowchart depicting an embodiment of a method that may be performed, at least in part, by the system depicted in FIG. 1.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where detect module ("mod") 305 detect a login of a user on a load balancing system. The load balancing include a set of servers. In this example, a user from a client computer, such as one of clients 104, 106, and 108 in FIG. 1, logs into the load balancing sub-system 102 including load balancer computer 200 in FIG. 1. The user may visit a website for shopping or any other activity. Upon login of the user, the load balancer computer 200 detects the login of the user.

Processing proceeds to step S260, where profile module 310 receives a user profile associated with the user who logs into the load balancing system. In this example, once the user logs into the load balancer sub-system 102, a user profile is fetched from, for example, one of the servers 110 and 112 in FIG. 1, or the load balancer computer 200. The user profile is matched and validated with the user identification (ID), and fetching of the user profile may occur during or before the user reaches the load balancer computer 200. Details of the user profile would be described later in FIG. 4. Further, resources status of the set of servers in the load balancing system is monitored, and in this step, a real time status of resources of the set of servers is also received.

Processing proceeds to step S265, where strategy module 315 defines a load balancing strategy based, at least in part, on the user profile. In this example, the load balance strategy 350 in FIG. 1 is generated based on the user profile, and may further be based on the real time status of resources of the set of server. The load balancing strategy may vary including, for example, assigning each type of computing resource a priority during load balancing, specifying each type of computing resource a weight, or any other suitable algorithm. The baseline of the load balancing strategy is to make use of resource matrix values in the user profile. A sample load balancing strategy is shown in Table 1.

TABLE 1

A sample load balancing strategy.

| | Server 1 | server 2 | server 3 | user profile | Priority only | Weight only | Mix (consider resource) |
|---|---|---|---|---|---|---|---|
| CPU | 70% | 50% | 30% | 3.00 | 1.0 | 0.3 | |
| Memory | 20% | 50% | 90% | 2.00 | 2.0 | 0.6 | |
| I/O | 50% | 50% | 50% | 1.00 | 3.0 | 0.1 | |
| User go to server 3 | | | | * | | | |
| CPU = 0.9; Mem = 1.2; IO = 0.1; | | | | | * | | |
| User go to server 1 | | | | | | | |
| User go to server 2 | | | | | | | * |

In Table 1, column "server 1" indicates a real time consumption of computing resources on the server 1, that is, CPU 70% consumed, memory 20% consumed, I/O 50% consumed, and so forth. Accordingly, columns "server 2" and "server 3" indicate a real time consumption of computing resources on server 2 and server 3, respectively. Column "user profile" indicates predicted weights of a user consumption on computing resources that are retrieved from the user's profile. The predicted weight may a percentage number or a number depending on resource type. In this example, it is a number, such as 3.00, 2.00 and 1.00.

Three strategies are shown in Table 1. Column "priority only" indicates a first strategy in which a server is selected based on a score calculated as the priority*user profile, for example, CPU=1.0*3.00=3; I/O=3.0*1.00=3; and Memory=2.0*2.00=4. For the first strategy CPU and I/O are the crucial consideration from the calculated score. I/O consumption on all the three servers are the same, so server 3 is chosen as indicated by the sign*in column "priority only" because the CPU on server 3 is consumed least.

Column "weight only" indicates a second strategy in which a server is selected based on a score calculated as the weight*user profile, for example:

CPU=0.3*3.00=9;

I/O=0.1*1.00=0.1; and

Memory=0.6*2.00=1.2.

For the second strategy memory is the crucial consideration from the calculated score, thus server 1 is chosen as indicated by the sign*in column "weight only" because the memory on server 1 is consumed least.

Column "mix (consider resource)" indicates a third strategy in which a server is selected based on a score calculated as the weight*the priority*user profile, for example:

CPU=0.3*1.0*3 0.00=9;

I/O=0.1*3.0*1.00=0.3; and

Memory=0.6**2.0*2.00=2.4.

For the third strategy server 2 is chosen as indicated by the sign*in column "mix(consider resource)" because the memory consumption on server 3 reaches a resource critical alert status (90%) and the CPU consumption on server1 reaches a resource warning alert status (70%).

The above three strategies are for illustrative purpose only, showing how to involve user profile value (predicted weight) into load balancing strategies. In some embodiments of the present invention, the strategies may already exist, and are modified or defined further by injecting the user profile value to the existing strategies.

Processing proceeds to step S270, where select module 320 selects a preferred server from the set of servers based, at least, on the load balancing strategy. In this example, once the load balance strategy 350 is generated, a preferred servers is chosen from the set of servers, for example, servers 110 and 112 in FIG. 1.

Processing stops at step S275, where direct module 325 directs the user to the preferred server. In this example, upon determination of the preferred server, the user is directed to the preferred server on which the user performs operations or activities, such as browsing a web for shopping or checking a bank account.

A user profile is a visual display of personal data associated with a specific user. In some embodiments of the present invention, a use profile is used to describe the user characteristics and preferences when using a specific system, and the resource consumption of the specific system by the user.

Figure 4:
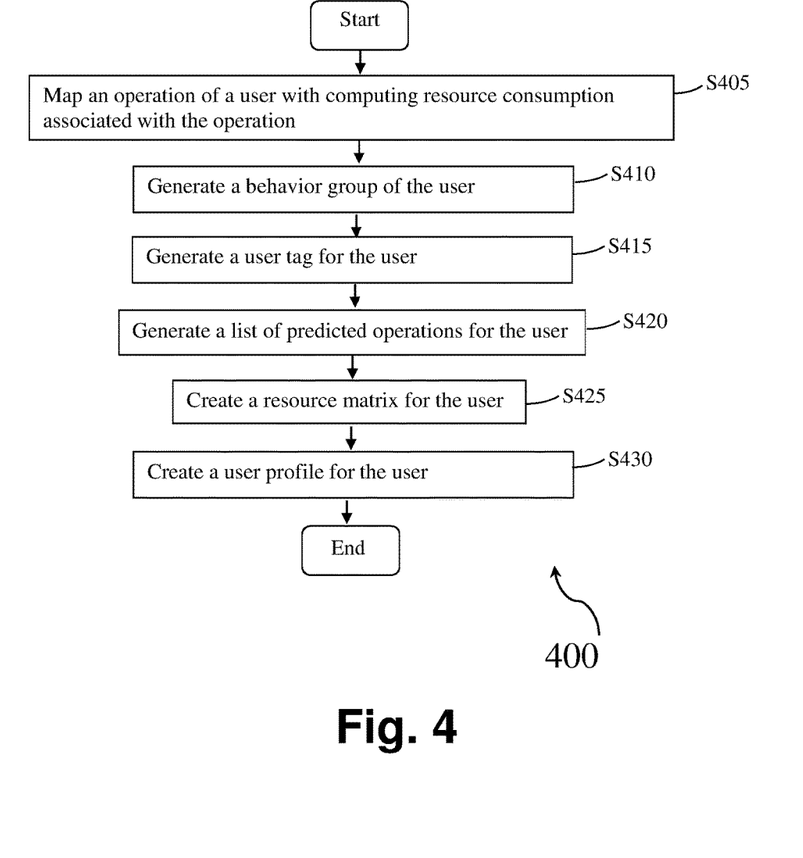
FIG. 4 is flowchart depicting a method of constructing a user profile according to an embodiment of the present invention.

FIG. 4 shows flowchart 400 depicting a first method for constructing a user profile according to the present invention. This method will now be discussed, over the course of the following paragraphs.

Processing begins at step S405 where an operation of a user is mapped with computing resource consumption associated with the operation. In this example, historical data including a set of system resource data, a set of system operation data and/or a set of baseline performance data may be used to get the mapping of resource usage per each user operation. The set of system resource data include, but not limited to: (i) resource specification of a physical or VM (virtual machine) server: CPU, RAM, disk (e.g., assigned to a specific application), and maximal read/write I/O; and/or (ii) historical system resource consumption logs, such as perfmon log, and nmon, which are arranged in a time-line manner. The system operation data includes, in some embodiments, all actions for all users visiting the system at any time slice, for example, historical logs of application operations in time line including session log of the user behavior, application log of user actions (such as login, browsing a page, filling something, submitting a table, navigating to another page), and recessive actions (such as calling a web service, reading/writing a database table).

For the baseline performance data, many approaches can be used to calculate the baseline performance. For example, 100 concurrent users run 1 operation (such as login) during a time period of 24 hours, the time of each login of each user, and the resources (e.g. CPU, RAM, disk, I/O, network) consumed every second are recorded. Then, an average time for 1 login action and an average resource consumption for each login action is calculated. Such average values are referred to as a performance baseline.

Processing proceeds to step S410 where a behavior group corresponding to the user is generated. A user behavior group describes the system interaction mode of a user. A system has many function areas, so function can be used as a grouping dimension. For example, where a system has tcp/http/https protocols, protocol may be considered as a grouping dimension.

In this example, all available user data about visiting the system can be retrieved from a system log, an operation log, and/or other types of logs. Usually the system log is developed to show/record some information for tracing, audit or security reason. Content of the system log varies in different applications, for example, logging a user including the time the user logs into the system, the time the user logs out of the system, editing a piece of information by the user, links the user visited, and/or protocols the user sued. The operation log refers to an application log of user actions such as login, browsing a page, filling something, submitting a table, navigating to another page, and/or operation type (e.g., click, input). Other types of logs include session log, error log, and so on.

In some embodiments of the present invention, the user data retrieved from the logs include columns such as timestamp, operation (functional), link visited, protocol, operation type (click/input). A data model can be applied to obtain a behavior group of the user from the retrieved user data. The data models, or decision tree models, for obtaining the behavior group of the user may be, for example C5.0 or C&R Tree. (Note: the term(s) "C5.0" and/or "C&R Tree" may be subject to trademark rights in various jurisdictions throughout the world and are used here only in reference to the products or services properly denominated by the marks to the extent that such trademark rights may exist.)

Processing proceeds to step S415 where a user tag for the user is generated. A user tag is used to distinguish a user behavior pattern. A user tag describes, but not limited to, operating frequency of the user, residence time of the user, operating type, preference of the user, and so on. A data model can be applied to obtain a user tag of the user from the retrieved user data in step S410. The data model for obtaining the user tag of the user may include, but is not limited to, K-Means clustering and Kohonen map. Using such models, a cluster (i.e., the user behavior pattern) is obtained and the cluster is assigned a user tag.

Processing proceeds to step S420 where a list of predicted operations of the user is generated. In this example, a data model can be applied to obtain the list of predicted operation of the user from the retrieved user data above in step S410. The data model for obtaining the list of predicted operations includes, but is not limited to, mining of stream, sequence, and time-series data. Using such models a list of historical activities (i.e., operations) is first generated to predict an activity list the user will possibly perform next time.

In some embodiments of the present invention, the list of predicted operations is further adjusted and/or modified by using a model such as a neural network or a Bayesian network and leveraging the user behavior group in step S410 and the user tag in step S415.

Processing proceeds to step S425 where a resource matrix for the user is created. In this example, the resource matrix is created by combing the mapping of user operation and resource consumption in step S405 with the list of predicted operations of the user in step S420. The resource matrix includes what resources the user would consume next time. The resource matrix further includes an average resource consumption in the system for each functionality, e.g. an average consumption of CPU, memory, I/O write, and or I/O read, which is exploited by the system monitoring from historical data during a period time for all users. Herein functionality refers to a system services that is invoked by a user, for example, login, input and submit.

There are many ways to calculate the average resource consumption. For example, during a time period, a total of 2 users use one functionality to query some result, a first user runs a query and the CPU usage is 5%, a second user runs the same query and the CPU usage is 10%. Then an average of CPU consumption is determined to be 7.5% to run this query.

Processing stops at step S430 where a user profile for the user is created. In this example, the user profile is created by combining the behavior group of the user in step S410, the user tag of the user in step S415, and the resource matrix for the user in step S425. The user profile may include the resource consumption of the user. For each login of the user, a resource consumption of the user is calculated by modeling the historical data in the resource matrix, and is stored for each login of the user.

TABLE 2

An example user profile.

| User Profile | User A |
| Tag | [describe the user behavior pattern] {calm, click operation, . . .} |
| Behavior Group | [describe the system interaction mode] {function area, protocol, . . .} |

| Resource Consumption | Predicted Weight | History 1 | History 2 | History 3 | ... | History N |
|---|---|---|---|---|---|---|
| CPU | 3% | 2.7% | 2.4% | 2% | ... | 1% |
| Memory | 2% | 4% | 2% | 4% | ... | 2% |
| I/O read | 1% | 1% | 2% | 3% | ... | 4% |
| I/O write | 1% | 0.8% | 1.1% | 1.6% | ... | 1.2% |

The user profile may further include predicted weight which is a prediction of the user on the system resource consumption for the user's next login and is calculated by modeling resource composition of historical login of the user. The predicted weight will be used to assess the user impact to the system, for example, how the user impacts on the system CPU and how the user consumes the system memory. This information may be used to adjust the load balancing policy/strategy for the user's next login to this system. Further, the user profile is updated continuously upon receiving more historical data. Table 2 shows an example user profile.

In Table 2, the values in column "predicted weight" are calculated based on "Tag," "Behavior Group," and "history 1," "history 2," . . . "history N." The predicted weight indicates how the user A will consume computing resources when the user A access the system next time.

Some embodiments of the present invention may include one, or more, of the following features, characteristics and/or advantages: (i) load balance is accurate; (ii) load balance is not based on a rough connection/transaction/session count; (iii) prediction is leveraged to know what resources would be consumed before a user acts; and/or (iv) with the weighted user binding to certain resource type, maximum utilization of servers capability could be achieved.

Some helpful definitions follow:

Present invention: should not be taken as an absolute indication that the subject matter described by the term "present invention" is covered by either the claims as they are filed, or by the claims that may eventually issue ar patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
   detecting a login associated with a user on a load balancing system, the load balancing system including a set of servers;
   constructing the current user profile including:
      generating a map of a set of operations directed by the user with corresponding computing resource consumption associated with operations in the set of operations;
      generating a behavior group of the user;
      generating a user tag for the user;
      determining a predicted operation from the set of operations that the user may direct;
      generating a list of predicted operations for the user including the predicted operation;
      creating a resource matrix for the user based, at least in part, on the list of predicted operations and the map; and
      creating the current user profile based, at least, on the behavior group, the user tag, and the resource matrix;
   responsive to detecting the login, identifying a current user profile associated with the user, the current user profile including a usage value corresponding to historic resource consumption for the user;
   predicting resource usage actions of the user based on the current user profile;
   defining a load balancing strategy using the set of servers, the load balancing strategy designed to perform the predicted resource usage actions on the set of servers;
   determining a strategic server from the set of servers based, at least in part, on the load balancing strategy by comparing resource availability within the set of servers, the strategic server having an available resource for the resource usage actions; and
   directing the user to the strategic server.

2. The method of claim 1, further comprising:
   identifying a resource status for each server of the set of servers.

3. The method of claim 1, further comprising:
   updating the current user profile to an updated user profile by further including in the current user profile a predicted resource consumption of the user for a next login based on recorded usage of resources while authorized by the login.

4. The method of claim 1, wherein the current user profile further includes a user tag of the user describing a behavior pattern of the user.

5. The method of claim 1, wherein the current user profile further includes behavior grouping information of the user for a characteristic of the load balancing system.

6. The method of claim 1, wherein:
   the user profile further includes historic usage patterns of the user; and
   predicting the resource usage actions is further based on the historic usage patterns.

7. A computer program product comprising a computer readable storage medium having a set of instructions stored therein which, when executed by a processor, causes the processor to:
   detect a login associated with a user on a load balancing system, the load balancing system including a set of servers;
   construct the current user profile including instructions to:
      generate a map of a set of operations directed by the user with corresponding computing resource consumption associated with operations in the set of operations;
      generate a behavior group of the user;
      generate a user tag for the user;
      determine a predicted operation from the set of operations that the user may direct;
      generate a list of predicted operations for the user including the predicted operation;
      create a resource matrix for the user based, at least in part, on the list of predicted operations and the map; and
      create the current user profile based, at least, on the behavior group, the user tag, and the resource matrix;
   responsive to detecting the login, receive a user profile associated with the user, the user profile including a usage value corresponding to historic resource consumption for the user;
   predict resource usage actions of the user based on the current user profile;
   define a load balancing strategy using the set of servers, the load balancing strategy designed to perform the predicted resource usage actions on the set of servers;
   determine a strategic server from the set of servers based, at least in part, on the load balancing strategy by comparing resource availability within the set of servers, the strategic server having an available resource for the resource usage actions; and
   direct the user to the strategic server.

8. The computer program product of claim 7, further causing the processor to:
   identify a resource status for each server of the set of servers.

9. The computer program product of claim 7, further comprising:
   updating the current user profile to an updated user profile by further including in the current user profile a predicted resource consumption of the user for a next login based on recorded usage of resources while authorized by the login.

10. The computer program product of claim 7, wherein the user profile includes a user tag of the user describing a behavior pattern of the user.

11. A computer system comprising:
    a processor set; and
    a computer readable storage medium;
    wherein:
    the processor set is structured, located, connected, and/or programmed to run program instructions stored on the computer readable storage medium; and
    the program instructions, which, when executed by the processor set, cause the processor set to:

detect a login associated with a user on a load balancing system, the load balancing system including a set of servers;
construct the current user profile including instructions to:
generate a map of a set of operations directed by the user with corresponding computing resource consumption associated with operations in the set of operations;
generate a behavior group of the user;
generate a user tag for the user;
determine a predicted operation from the set of operations that the user may direct;
generate a list of predicted operations for the user including the predicted operation;
create a resource matrix for the user based, at least in part, on the list of predicted operations and the map; and
create the current user profile based, at least, on the behavior group, the user tag, and the resource matrix;
responsive to detecting the login, receive a user profile associated with the user, the user profile including a usage value corresponding to historic resource consumption for the user;
predict resource usage actions of the user based on the current user profile;
define a load balancing strategy using the set of servers, the load balancing strategy designed to perform the predicted resource usage actions on the set of servers;
determine a strategic server from the set of servers based, at least in part, on the load balancing strategy by comparing resource availability within the set of servers, the strategic server having an available resource for the resource usage actions; and
direct the user to the strategic server.

12. The computer system of claim 11, further causing the processor to: identify a resource status for each server of the set of servers.

13. The computer system of claim 11, wherein user profile further includes a user tag of the user describing a behavior pattern of the user.

14. The computer system of claim 11, wherein the user profile further includes behavior grouping information of the user for a characteristic of the load balancing system.

* * * * *